(12) United States Patent
Foti

(10) Patent No.: US 8,831,032 B2
(45) Date of Patent: Sep. 9, 2014

(54) SIP-HTTP APPLICATION CORRELATOR

(75) Inventor: George Foti, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 238 days.

(21) Appl. No.: 12/235,266

(22) Filed: Sep. 22, 2008

(65) Prior Publication Data

US 2009/0225760 A1   Sep. 10, 2009

Related U.S. Application Data

(60) Provisional application No. 61/033,872, filed on Mar. 5, 2008, provisional application No. 61/040,219, filed on Mar. 28, 2008.

(51) Int. Cl.
*H04L 12/66* (2006.01)
*H04L 29/08* (2006.01)
*H04L 29/06* (2006.01)

(52) U.S. Cl.
CPC ............. *H04L 67/02* (2013.01); *H04L 65/1016* (2013.01); *H04L 67/142* (2013.01); *H04L 69/08* (2013.01); *H04L 65/1006* (2013.01)
USPC ....................................................... 370/466

(58) Field of Classification Search
None
See application file for complete search history.

(56) References Cited

U.S. PATENT DOCUMENTS

| | | | |
|---|---|---|---|
| 7,295,543 B2 | 11/2007 | Kikuchi et al. | |
| 7,706,401 B2 * | 4/2010 | Bae et al. | 370/466 |
| 8,291,100 B2 | 10/2012 | Ogasawara et al. | |
| 2006/0209794 A1 | 9/2006 | Bae et al. | |
| 2007/0094283 A1 * | 4/2007 | Fung et al. | 707/101 |
| 2007/0143489 A1 * | 6/2007 | Pantalone | 709/230 |
| 2009/0006637 A1 * | 1/2009 | George et al. | 709/230 |
| 2009/0017796 A1 * | 1/2009 | Foti | 455/414.1 |
| 2009/0093237 A1 * | 4/2009 | Levenshteyn et al. | 455/412.1 |
| 2009/0132717 A1 * | 5/2009 | Maes | 709/228 |
| 2009/0168758 A1 * | 7/2009 | Apelqvist et al. | 370/352 |
| 2009/0183211 A1 * | 7/2009 | Yan et al. | 725/88 |
| 2009/0190603 A1 * | 7/2009 | Damola et al. | 370/401 |
| 2011/0072144 A1 * | 3/2011 | Fikouras et al. | 709/230 |

FOREIGN PATENT DOCUMENTS

| | | |
|---|---|---|
| EP | 1519537 A2 | 3/2005 |
| TW | I272493 B | 2/2007 |
| TW | I274491 B | 2/2007 |
| TW | I276335 B | 3/2007 |
| WO | 2007/071269 A1 | 6/2007 |

OTHER PUBLICATIONS

R. Levenshteyn et al., Mobile Services Interworking for IMS and XML WebServices, IEEE Communications Magazine, Sep. 2006.
PCT Search Report from corresponding application PCT/IB2009/050836.
Open IPTV Forum—Functional Architecture—V1.1, Open IPTV Forum, Jan. 15, 2008.
Patent Abstracts of Japan for JP2005-101922, 1 page, Apr. 14, 2005.

* cited by examiner

*Primary Examiner* — Marcus R Smith
(74) *Attorney, Agent, or Firm* — David J Rahmer; Ericsson Canada Inc.

(57) ABSTRACT

Systems and methods according to the present invention facilitate communications between devices which utilize different signaling protocols. A gateway can analyze incoming messages, in a first protocol such as SIP, to identify an application instance to which the messages should be routed. The messages can then be converted into another protocol and forwarded to the identified application.

34 Claims, 14 Drawing Sheets

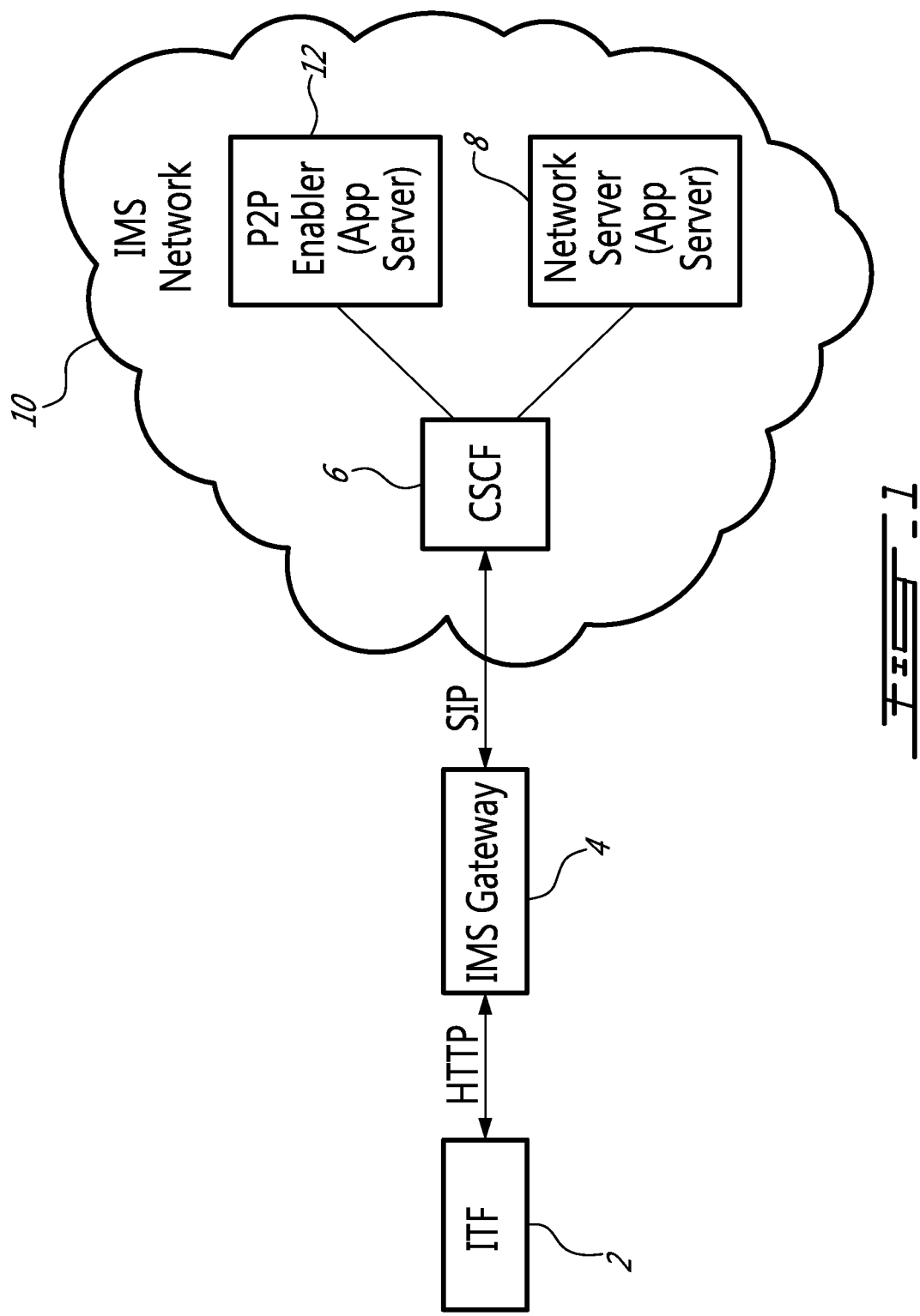

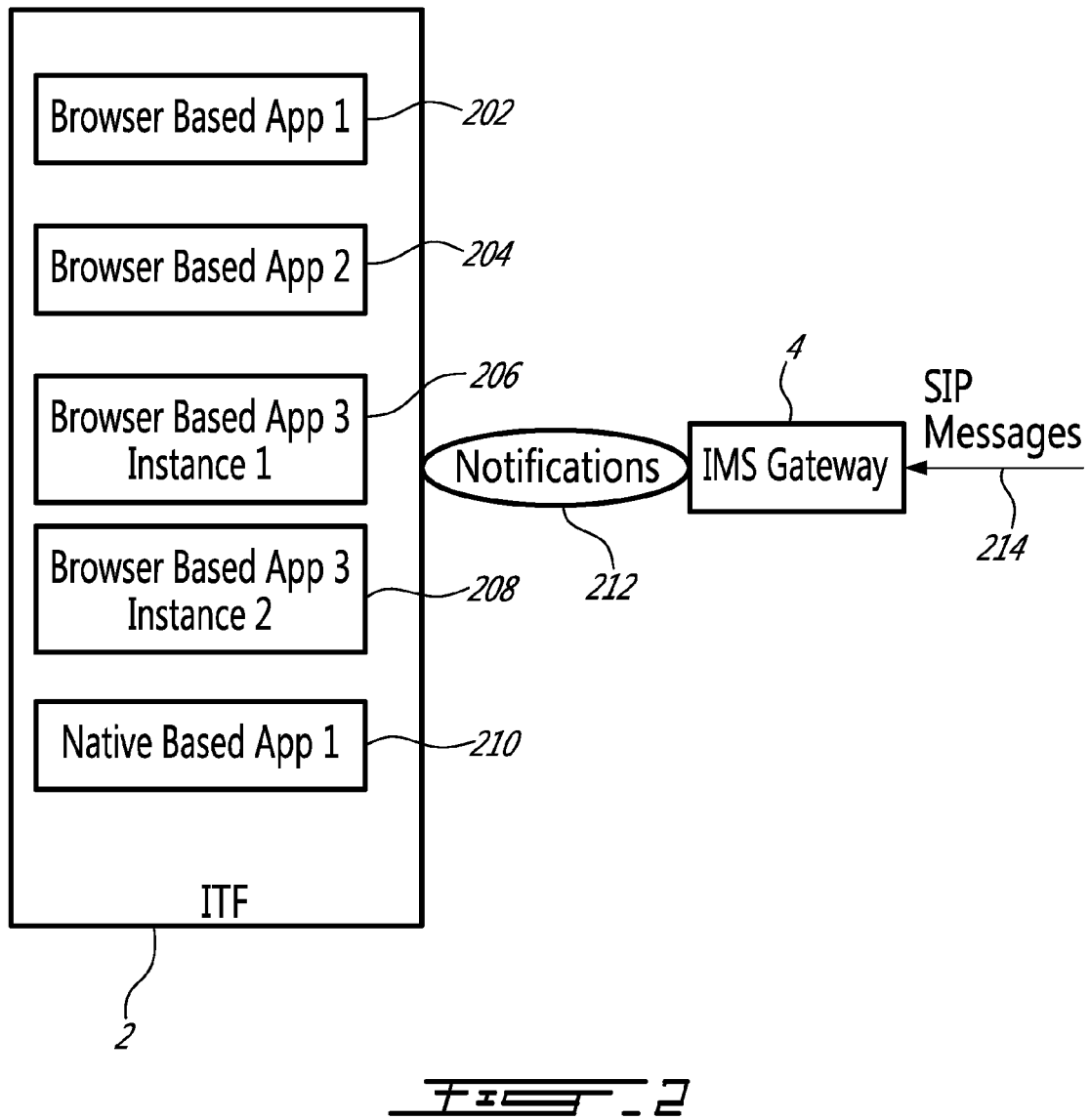

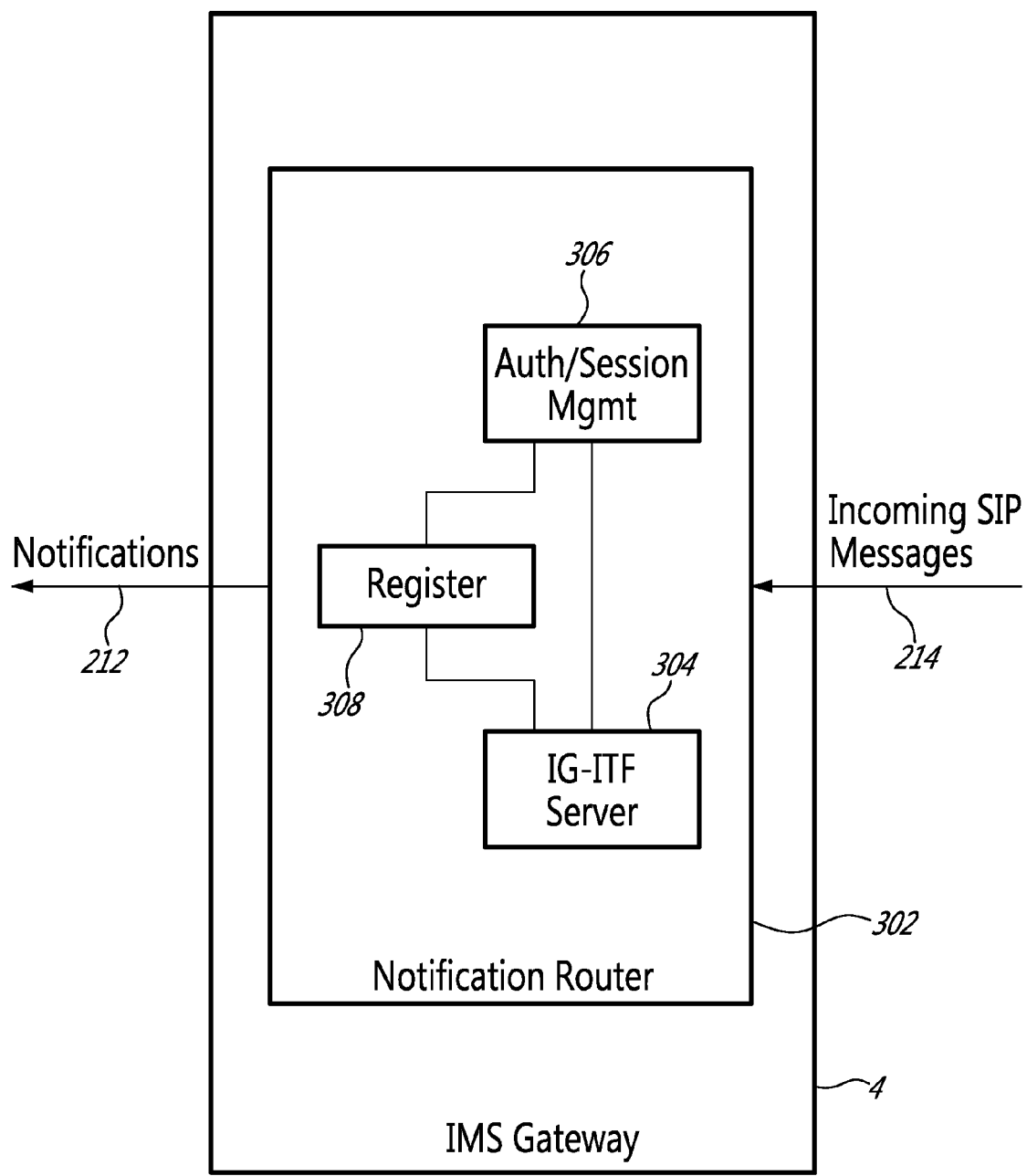

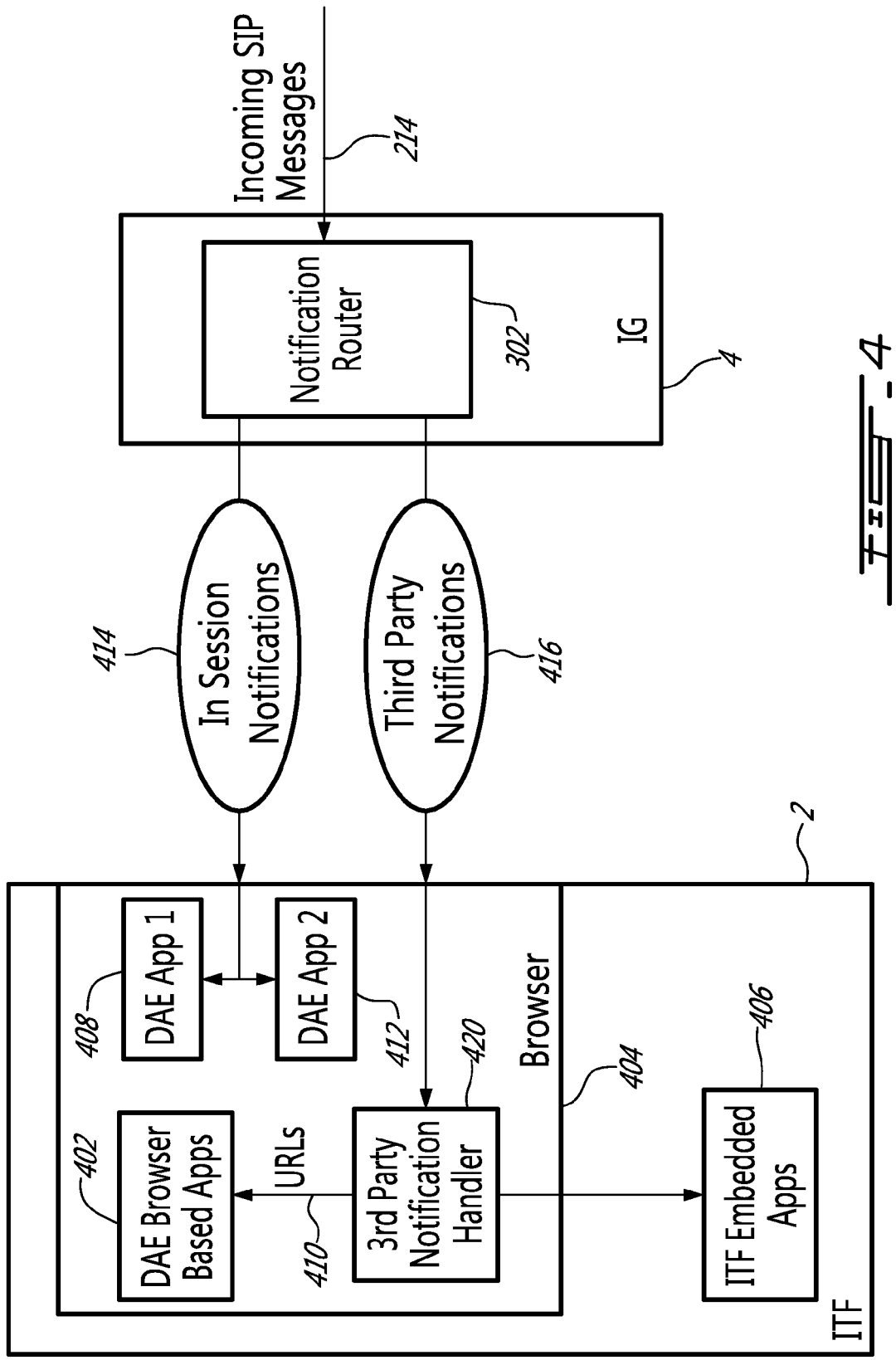

| Application Identification (ID) | IMS Communication Service Identifier (ICSI) | Uniform Resource Locator (URL) | |
|---|---|---|---|
| 1 | ICSI1 | URL1 | |
| 2 | ICSI1 | URL2 | |
| 3 | ICSI2 | URL3 | |
| 4 | ICSI3 | URL4 | Pre-configured by SP for DAE Applications |
| 5 | Undefined | URL5 | |
| 6 | ICSI3 | URL6 | |
| Default | ICSI1 | NIL | |
| Default | ICSI2 | NIL | |
| Default | ICSI3 | NIL | |
| Default | ICSI4 | NIL | |
| Undefined | Undefined | Default URL | |
| 7 | Undefined | NIL | ITF Embedded Applications |
| 8 | ICSI4 | NIL | |

FIG. 5a

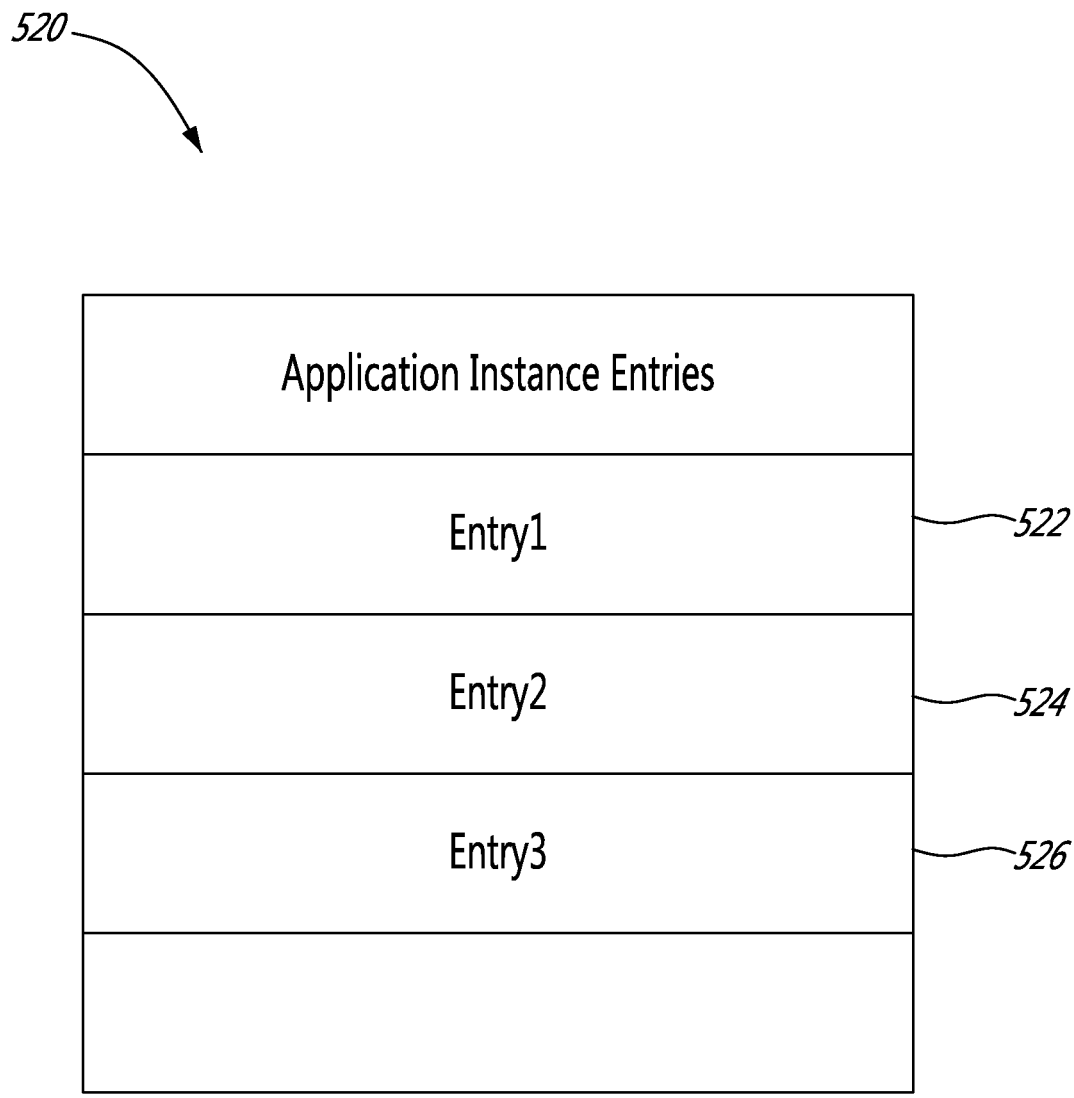

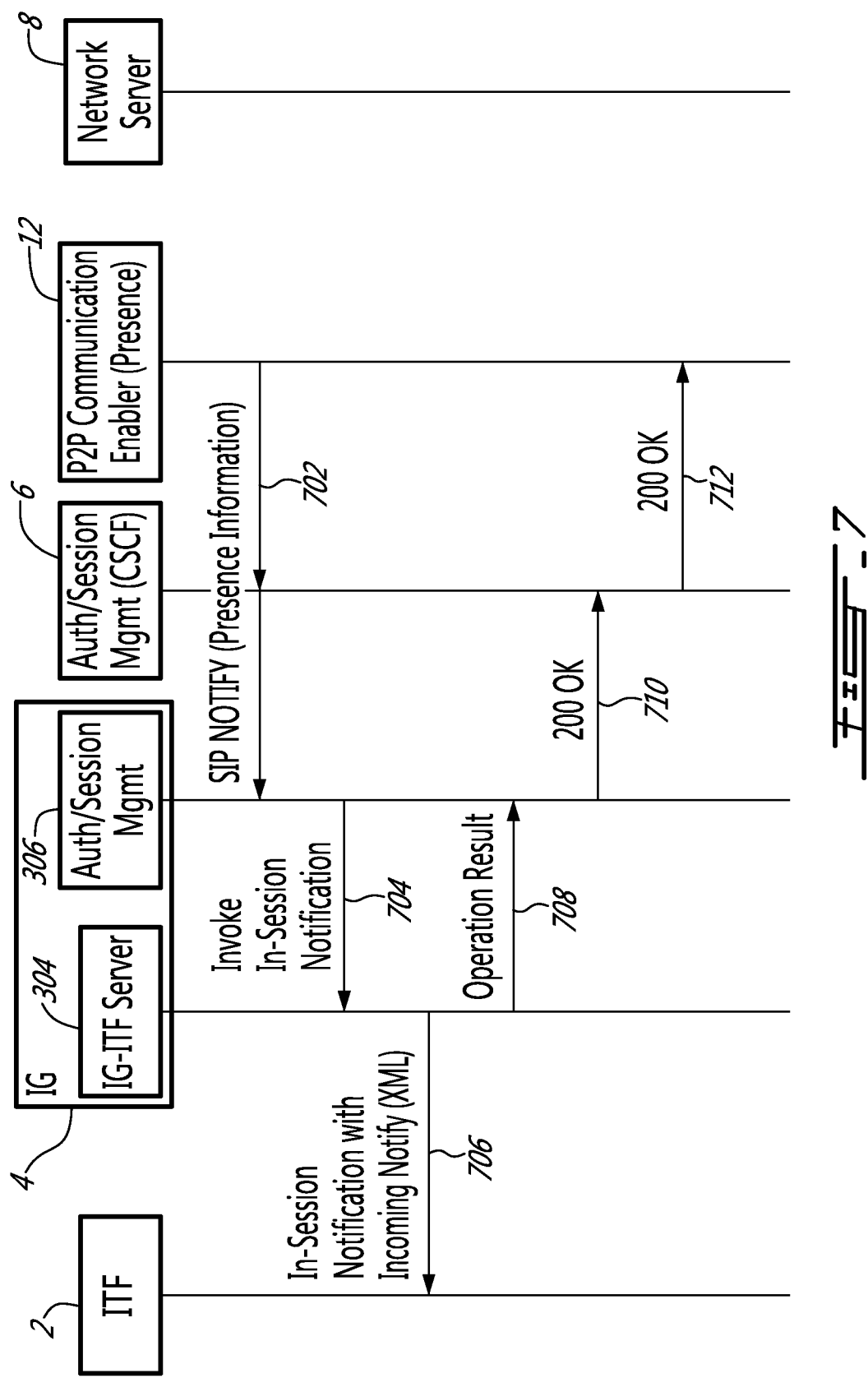

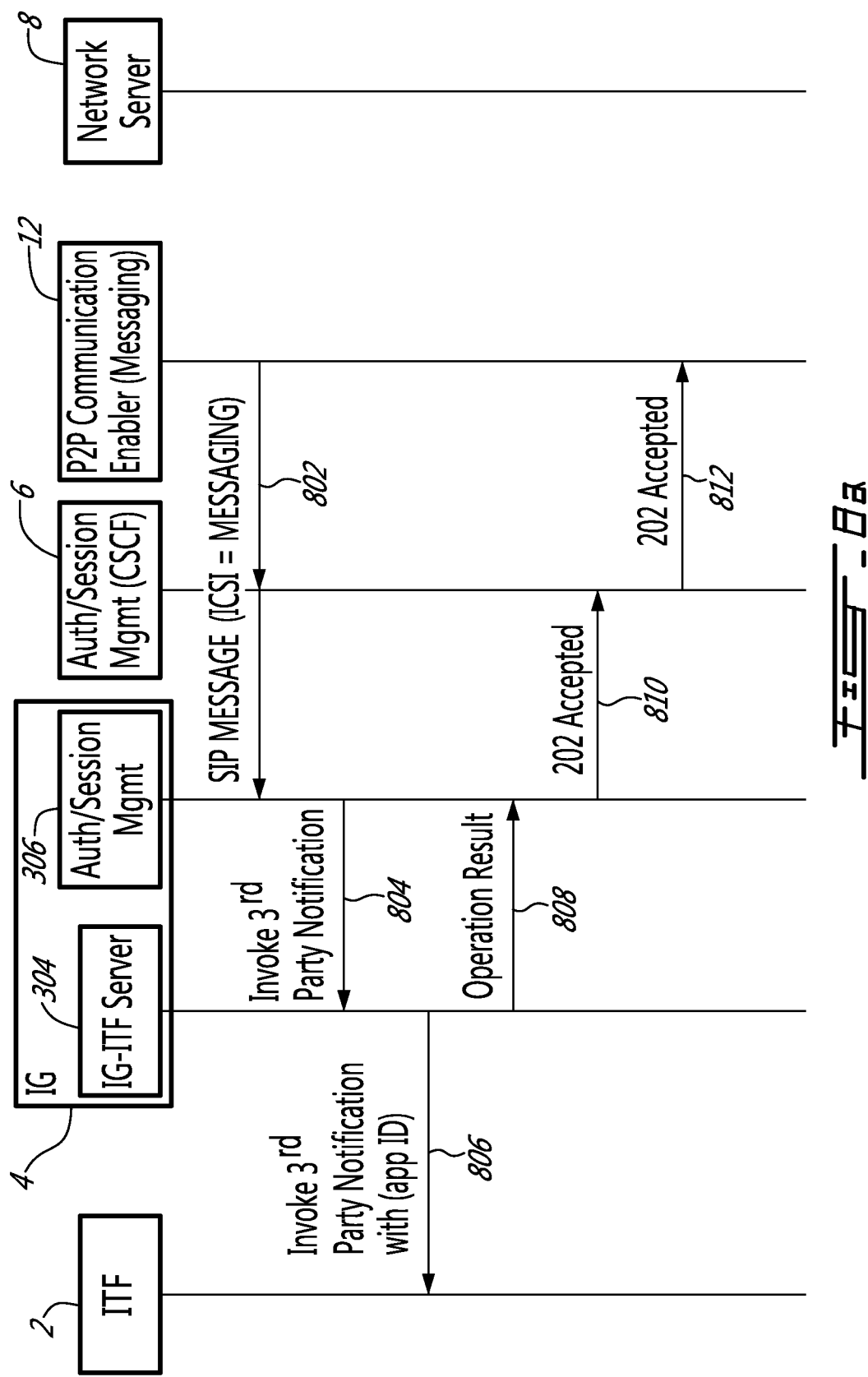

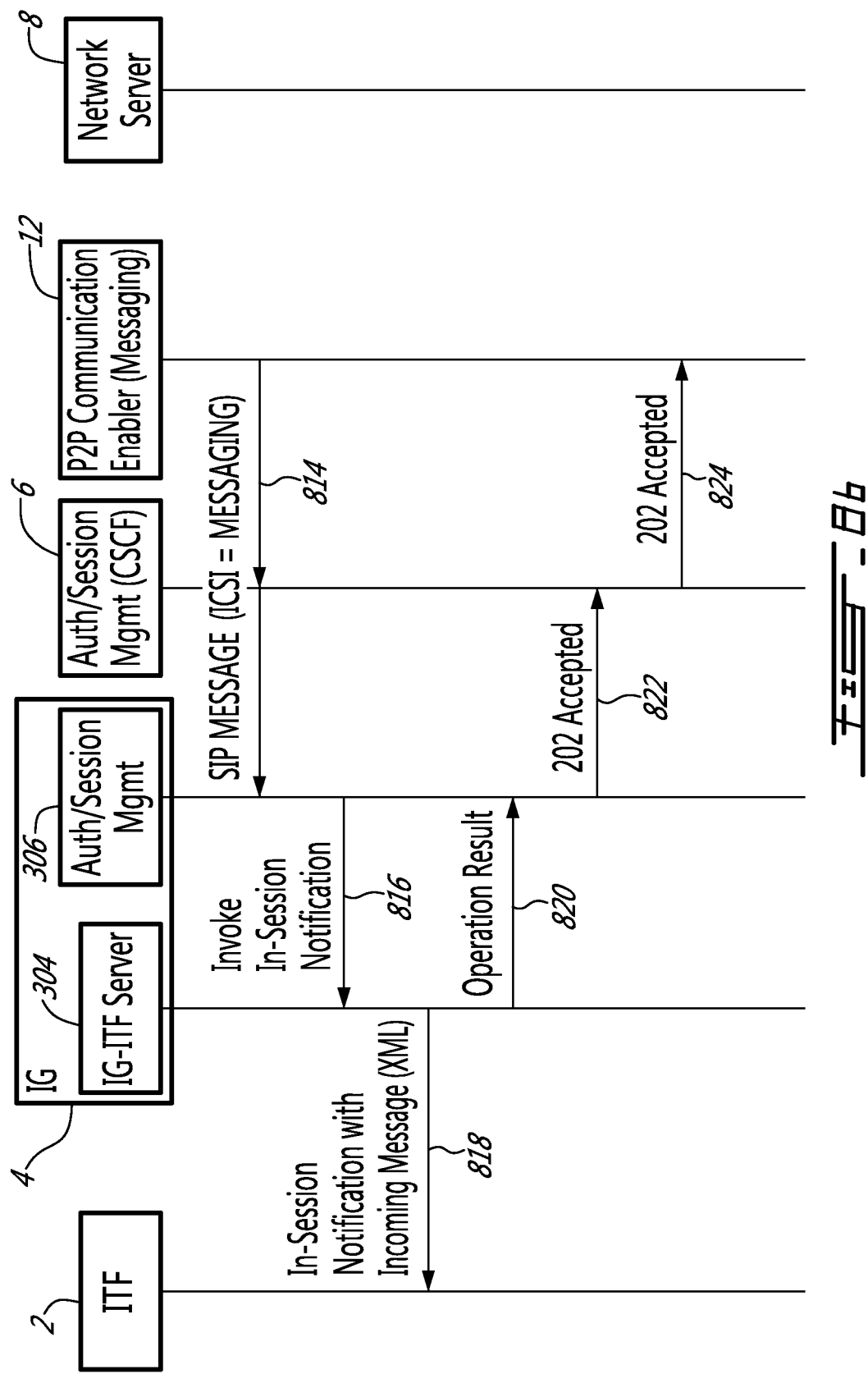

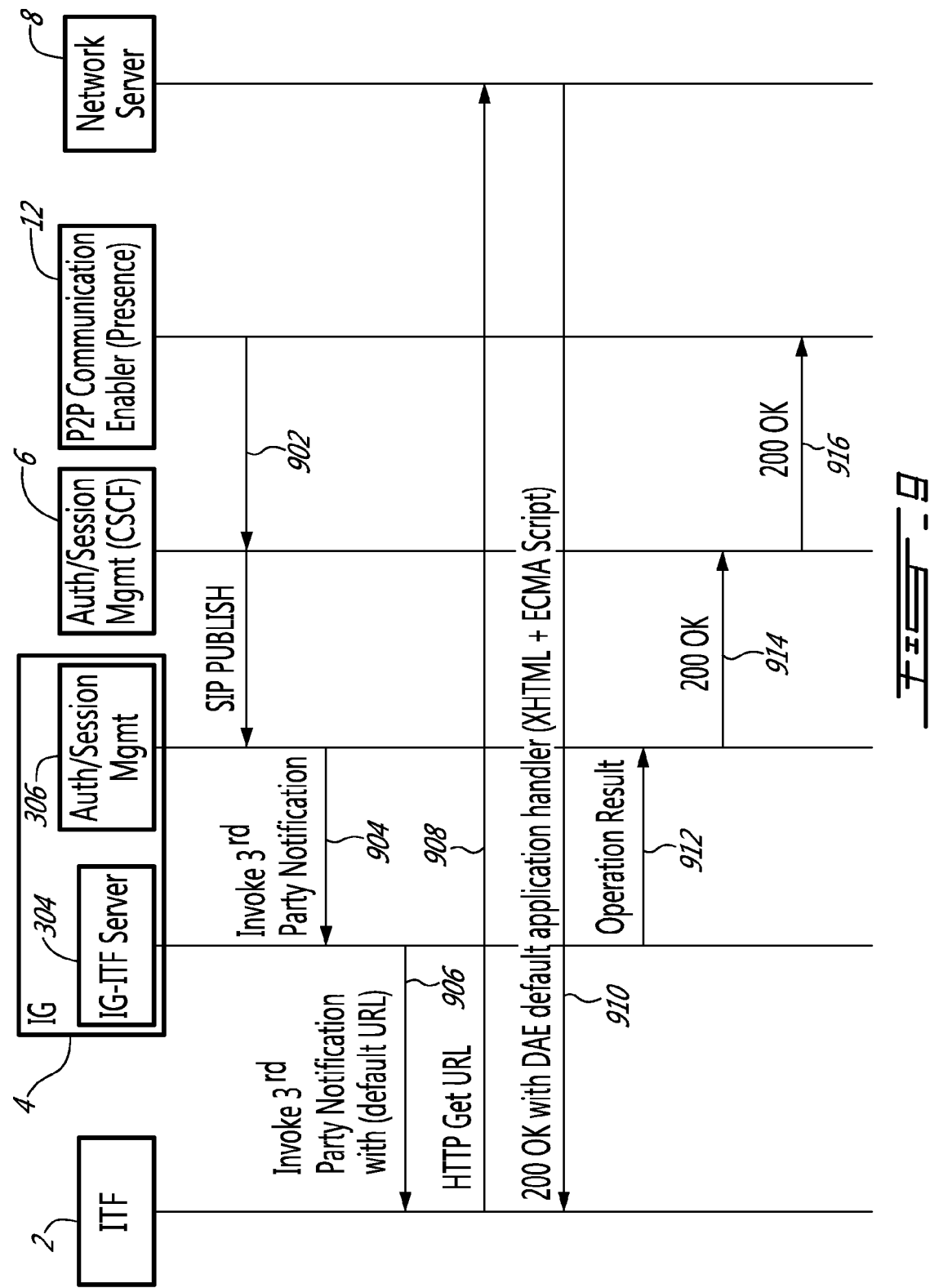

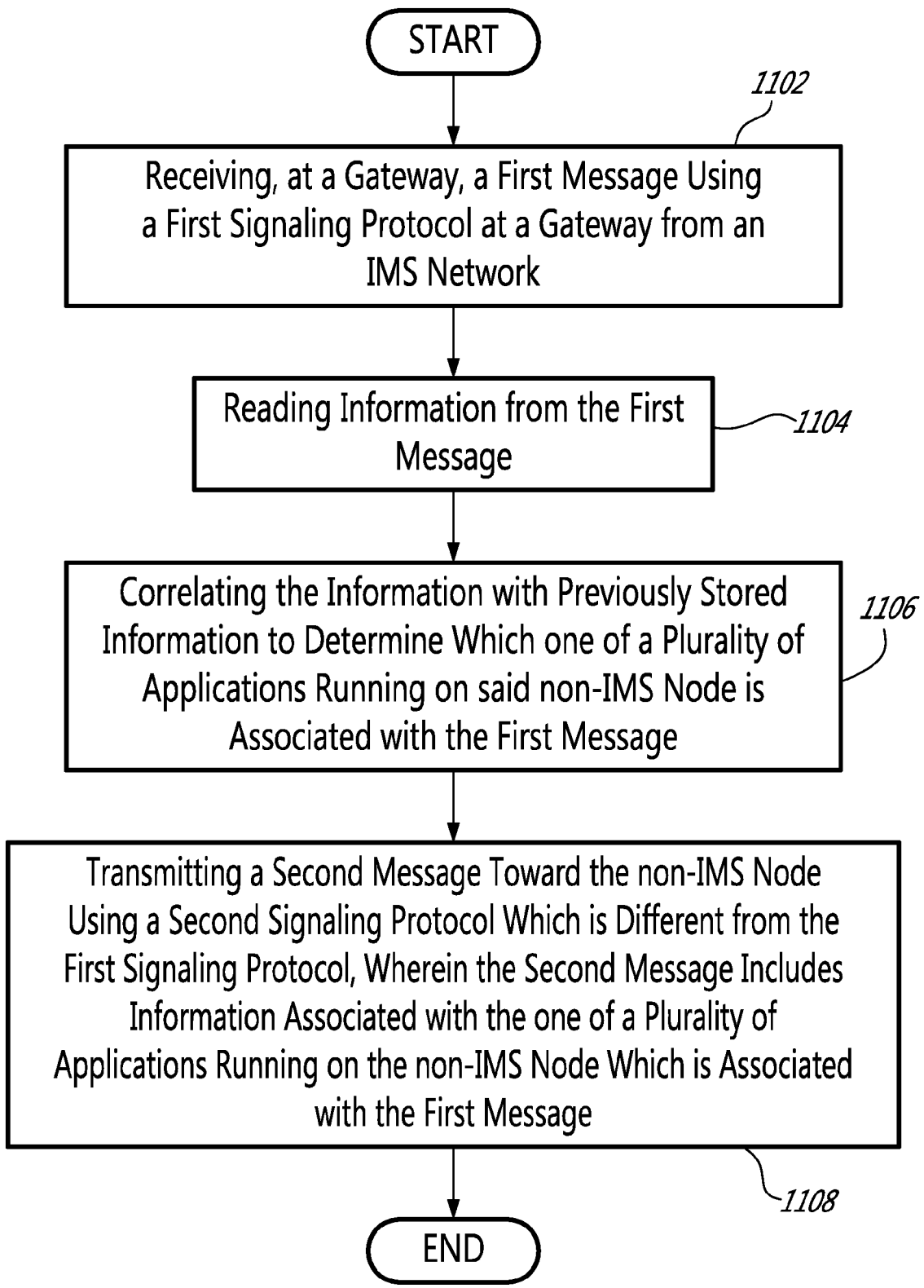

SIP-HTTP APPLICATION CORRELATOR

RELATED APPLICATIONS

This application is related to, and claims priority from, U.S. Provisional Patent Application Ser. No. 61/033,872, filed on Mar. 5, 2008, entitled "SIP-HTTP Application Correlator" and U.S. Provisional Patent Application Ser. No. 61/040,219 filed on Mar. 28, 2008, entitled "Notification Framework for Third Party Notifications", the disclosures of both of which are incorporated here by reference.

TECHNICAL FIELD

The present invention relates generally to telecommunications systems and improving service therein.

BACKGROUND

As the level of technology increases, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally, cellular phones and Wi-Fi have added a mobile element to communications. Similarly, in the entertainment industry, 30 years ago there was only one format for television and this format was transmitted over the air and received via antennas located at homes. This has evolved into both different standards of picture quality such as, standard definition TV (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available throughout the network including the "last mile" to the end user.

Another related technology that impacts both the communications and entertainment industries is the Internet. One protocol that has been used with the Internet since the early 1990s is the Hyper Text Transfer Protocol (HTTP). This protocol is a transaction-based protocol which was initially designed primarily for accessing Hyper Text Markup Language (HTML) pages and was not necessarily designed to handle the physical structures of the Internet and associated communication streams which have evolved to handle an increased flow of data. For example, servers have more memory than ever before, communications links exist that have a higher bandwidth than in the past, processors are faster and more capable and protocols exist to take advantage of these elements. As consumers' usage of the Internet expands, service companies have turned to the Internet (and other Internet Protocol (IP) networks) as a mechanism for providing traditional services. Evolutions to the HTTP, e.g., HTTP 1.1, have improved its capabilities in this regard and various hardware vendors are familiar with integrating HTTP with their equipment. Newer services now exist which take advantage of previous improvements including, for example, IP television (IPTV, referring to systems or services that deliver television programs over a network using IP data packets), video on demand (VOD), voice over IP (VoIP), and other web related services received singly or bundled together.

To accommodate the new and different ways in which IP networks are being used to provide various services, new network architectures are being developed and standardized. IP Multimedia Subsystem (IMS) is an architectural framework utilized for delivering IP multimedia services to an end user. The IMS architecture has evolved into a service-independent topology which uses IP protocols, e.g., Session Initiation Protocol (SIP) signaling which operates in a peer to peer fashion, to provide a convergence mechanism for disparate systems. In part this is accomplished via the provision of a horizontal control layer which isolates the access network from the service layer. Among other things, IMS architectures may provide a useful platform for the rollout of IPTV systems and services.

Accordingly, exemplary embodiments described below address the need for network entities and methods which facilitate communications between devices which utilize different signaling protocols.

SUMMARY

Systems and methods according to the present invention address this need and others by providing techniques which facilitate communications between devices which utilize different protocols.

According to exemplary embodiments, a method for dynamically correlating application information between an Internet Protocol (IP) Multimedia Subsystem (IMS) network and a non-IMS node includes: receiving, at a gateway, a first message using a first signaling protocol from the IMS network; reading information from the first message; correlating the information with previously stored information to determine which one of a plurality of applications running on the non-IMS node is associated with the first message; and transmitting a second message towards the non-IMS node using a second signaling protocol which is different from the first signaling protocol, wherein the second message includes information associated with the one of a plurality of applications running on the non-IMS node which is associated with the first message According to another exemplary embodiment, a gateway device includes: a communication interface for transmitting and receiving messages, wherein a first received message using a first signaling protocol includes information associated with an application; a memory for storing information which includes application identifications (IDs), Uniform Resource Locators (URLs), default information and IMS Communication Service Identifiers (ICSIs); and a processor for correlating the first received message using the first signaling protocol with the stored information to determine a desired application to generate a second message using a second signaling protocol different from the first signaling protocol, wherein the second message using a second signaling protocol includes information associated with the application that allows the non-IMS node to identify the desired application from amongst a plurality of applications executing on the non-IMS node.

BRIEF DESCRIPTION OF THE DRAWINGS

The accompanying drawings illustrate exemplary embodiments, wherein:

FIG. 1 shows signaling between an Internet Protocol (IP) Multimedia Subsystem (IMS) network and an Internet Protocol Television Terminal Function (ITF) according to exemplary embodiments;

FIG. 2 depicts an ITF which is running multiple applications in communications with an IMS gateway according to exemplary embodiments;

FIG. 3 shows an IMS gateway according to exemplary embodiments;

FIG. 4 shows an IMS gateway transmitting different types of messages to an ITF according to exemplary embodiments;

FIG. 5(a) shows an application identification table for storing information according to exemplary embodiments;

FIG. 5(b) shows a traffic table according to exemplary embodiments;

FIGS. 6(a), 6(b), 7, 8(a), 8(b) and 9 are signaling diagrams for illustrating SIP signaling at an IMS gateway for accessing an application according to exemplary embodiments;

FIG. 11 shows a method flow chart for correlating application information between an IMS network and a non-IMS node according to exemplary embodiments.

DETAILED DESCRIPTION

Figure 6A:
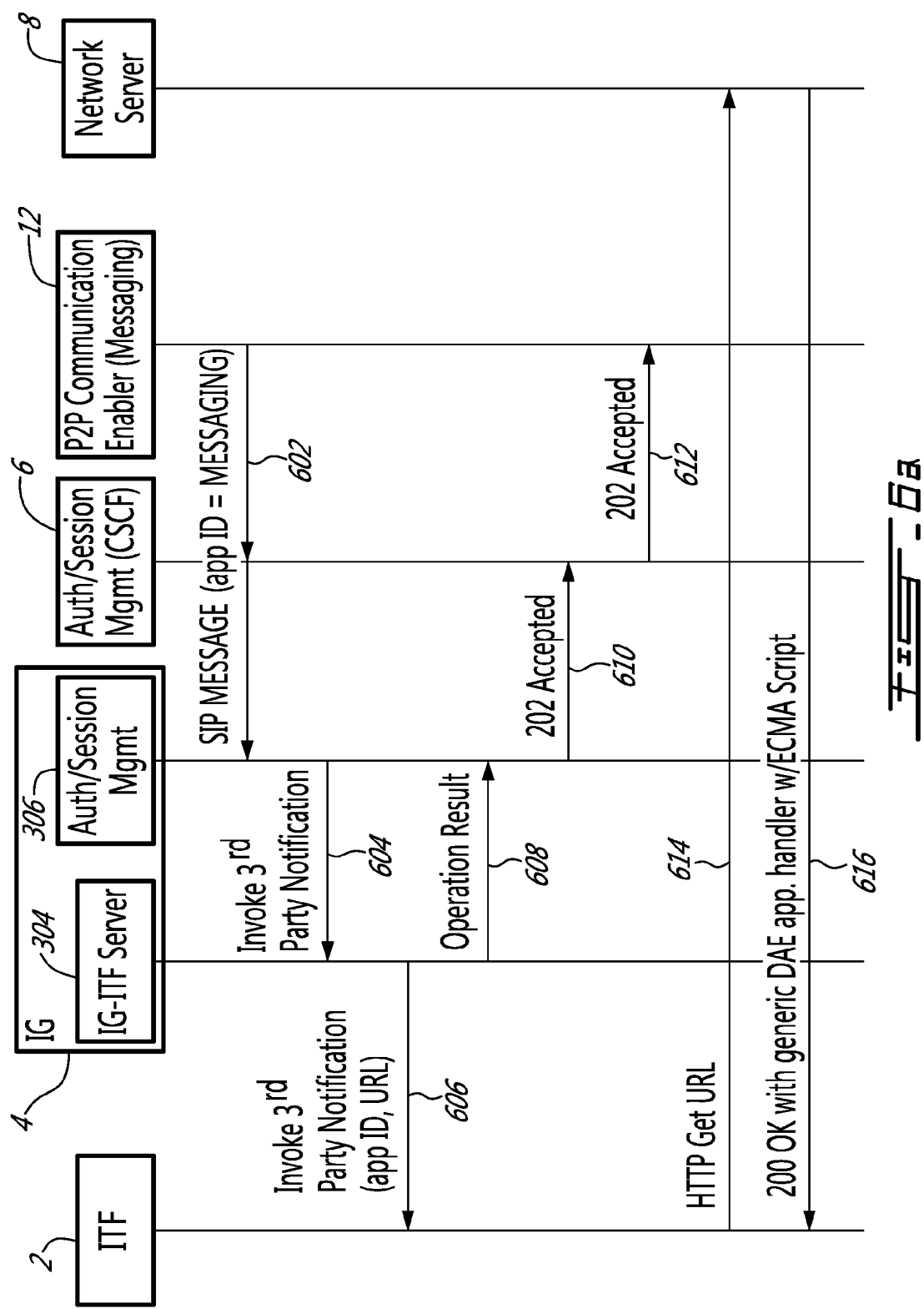

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Hyper Text Transfer Protocol (HTTP) and Session Initiation Protocol (SIP) are protocols which can be used in support of the delivery of services over a network or networks. In some cases, hardware vendors, e.g., manufacturers of Internet Protocol television (IPTV) terminal functions (ITFs) and the like, may use HTTP in their products, whereas service providers which use the Internet Protocol Multimedia Subsystem (IMS) network architecture for delivery of services, e.g., IPTV, may use Session Initiation Protocol (SIP) in their products. HTTP is a transaction-based protocol, whereas SIP is a session-based protocol which allows communications between devices which have SIP endpoints. While systems which use HTTP are capable of receiving some IMS associated services, e.g., using HTTP signaling for transporting IPTV signaling, these systems are typically not capable of utilizing certain protocols that are used on newer architectures, such as SIP, which is utilized on the afore-mentioned IMS network architecture. Devices using SIP signaling and devices which use HTTP signaling will need an interface, for example an IMS gateway, for transferring information from one protocol to the other for further transportation. This concept can be seen at a high level with respect to the exemplary components shown in FIG. 1.

FIG. 1 includes an ITF 2, an IMS gateway 4 and an IMS Network 10. The ITF 2, which can be, for example, any ITF which complies with the Open ITF (OITF) requirements as found at www.openiptvforum.org, and the IMS gateway 4 are located in the same general place, e.g., a household, and communicate with each other using HTTP signaling. IMS gateway 4 communicates with the IMS network 10 using SIP signaling. In this exemplary embodiment, the IMS network 10 is shown with a call session control function (CSCF) 6 which performs authentication and session management, and two application servers, e.g., a peer-to-peer (P2P) communication enabler 14 for messaging and a network server 8 which is associated with a unique uniform resource locator (URL). IMS gateway 4 has the ability to use both HTTP signaling and SIP signaling as well as the ability to correlate signaling requests from either side. More specifically, IMS gateway 4 receives SIP messages and forwards the information using non-SIP signaling, e.g., HTTP signaling, to the correct applications running on the ITF 2 as will be described below according to exemplary embodiments. More information regarding HTTP signaling can be found in Request for Comments (RFC) 2616 dated June 1999. IMS network 10 is shown in a simplified format with only certain nodes depicted to illustrate the signaling process in the below described exemplary embodiments, however more nodes are typically found in an IMS network 10 and more detail regarding IMS architecture generally and SIP signaling can be found in the Third Generation Partnership Project (3GPP) Technical Specification (TS) 23.228 Version 8 dated March 2007 and RFC 3261 dated June 2002, respectively.

According to exemplary embodiments, as shown in FIG. 2, ITF 2 can be running multiple applications, e.g., browser based application 1 202, browser based application 2 204 and native based application 1 210, as well as multiple instances of the same application, e.g., browser based application 3 instance 1 206 and browser based application 3 instance 2 208. Brower based applications can operate in a distributed application environment (DAE) and include, for example, such applications as presence and chat/messaging. Native based applications can operate in ITF embedded applications such as, registration and profile management. However, these application examples associated here with both the browser based and native based are purely illustrative and it will be understood by those skilled in the art that nothing restricts an application from being developed as either browser based or native based. Also as shown in FIG. 2, IMS gateway 4 receives SIP messages 214 which include information that possibly pertains to one of the applications running in ITF 2. IMS gateway 4 forwards this information as notifications 212 to the ITF 2 where the notifications arrive at the desired applications as described below.

Figure 10:
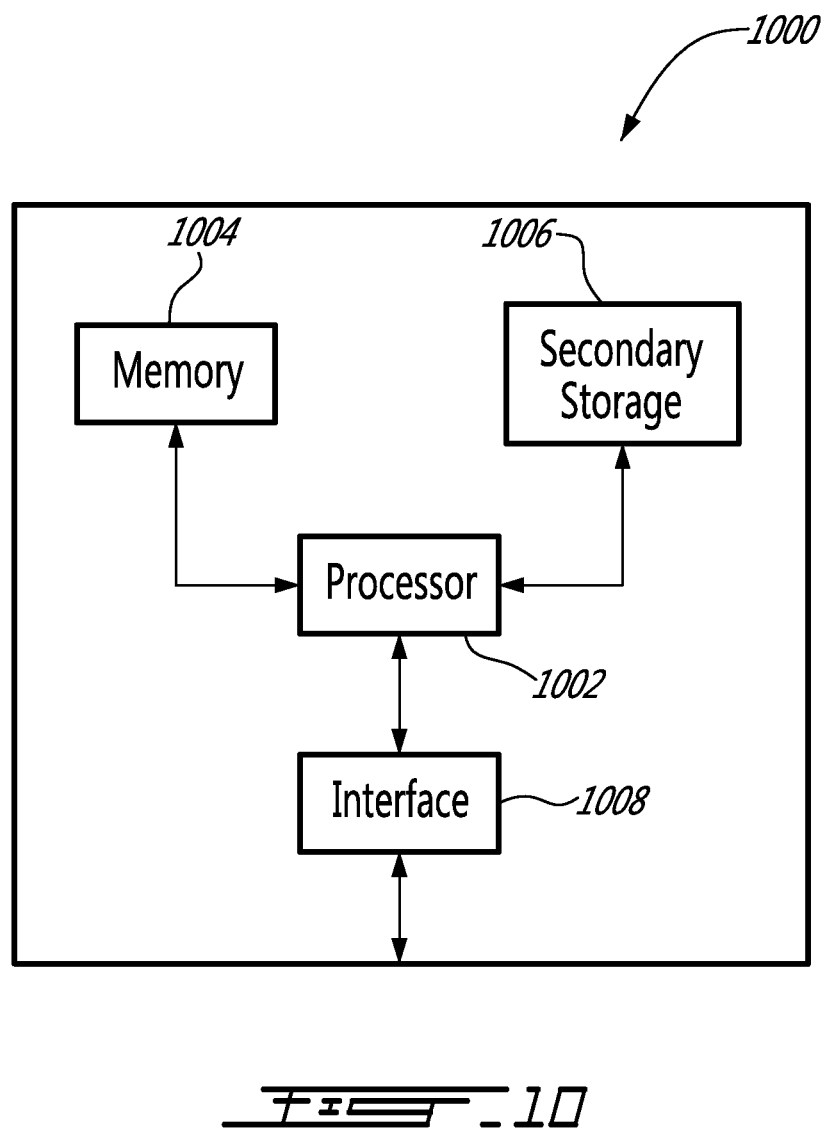
FIG. 10 shows a communications node according to exemplary embodiments.

Exemplary IMS gateway 4 will now be described with respect to FIG. 3. The IMS gateway 4 matches incoming SIP messages 214 from the IMS network 10 with applications running on ITF 2. IMS gateway 4 includes a notification router 302 which is responsible for ensuring that incoming SIP messages 214, which are destined for the ITF 2, are dispatched to the proper application in the ITF 2. In support of this function, the notification router 302 includes an authorization/session management function 306, an IMS gateway (IG)-ITF server 304 and a register 308 according to this exemplary embodiment. The authorization/session management function 306 is used for authorization and session management with the IMS network 10, both for itself and for ITF 2 including its associated applications. The IG-ITF server 304 transmits messages to the ITF 2. The register 308 includes information related to applications supported in the ITF 2, SIP session information, uniform resource locator (URL) information and other identifying information, e.g., information pre-configured by the operator network, which is used to uniquely identify an application running on ITF 2 for correct matching of the incoming SIP messages 214 with their respective ITF applications. Both the authorization/session management function 306 and the IG-ITF server 304 communicate with the register 308 when determining the SIP message/ITF application relationship for message forwarding. Additionally these functions can be used in populating the register 308 with information as needed. The IMS gateway 4 according to this exemplary embodiment is a stateful device which maintains knowledge of applications that are running in ITF 2 and associated SIP dialog information as needed. Also, the IMS gateway 4 maintains such states in its memory (not shown in FIG. 3, but shown in FIG. 10 described below) as long as ITF 2 is powered on. Applications, both from an ITF 2 and an IMS gateway 4 point of view, will be described in more detail below.

According to exemplary embodiments, multiple applications can be operating at once on ITF 2. As described above, these applications can be segregated into two general categories, e.g., the DAE based applications and ITF embedded applications, of applications which execute service logic in the ITF 2. From the IMS gateway 4 perspective (as it interfaces with IMS network 10 using SIP), these applications are interfaced with SIP communications in three different ways according to this exemplary embodiment depending upon, for example, the existence of (or need for) a SIP dialog and state information.

The first way to interface applications with SIP communications according to these exemplary embodiments is associated with applications which require a SIP dialog, e.g., presence and session setup. A SIP dialog occurs when two entities with SIP endpoints, e.g., IMS gateway 4 and an IMS node, engage in communications using SIP. Other applications do not require a SIP dialog; they are primarily a stand-alone transaction type of application (instant messaging or registration) where there is no need for a SIP dialog. An incoming SIP message to the IMS gateway 4 can be viewed as one of three types of messages, e.g., a new message, a message for an existing SIP dialog or a message response to a request initiated from an application in ITF 2, for event handling purposes according to an exemplary embodiment. A new message can, for example, be a SIP MESSAGE for which there is no existing SIP dialog. An existing message can, for example, be a SIP NOTIFY that belongs to an existing SIP dialog. A message response can, for example, be a SIP 200 OK to a request initiated by the IMS gateway 4, e.g., a service request message originated by the ITF 2 and correctly modified/forwarded by the IMS gateway 4. These three differently handled notification events will be described in more detail below.

According to exemplary embodiments, IMS gateway 4 communicates with ITF 2 for delivering different types of notifications based upon the type of notification event to the appropriate applications as shown in FIG. 4. Initially, the IMS gateway 4 receives an incoming SIP message 214. The notification router 302 determines which type of event has been received. The notification router 302 then creates and sends either an in session notification 414 or a third party notification 416 to ITF 2. In session notifications are typically used when there is an ongoing communication between an active application on ITF 2 and the IMS gateway 4. Third party notifications are typically used for new messages that will start a communication with a non-active application in ITF 2. If the notification is an in session notification 414, then the notification is forwarded to the appropriate DAE application, e.g., DAE App 1 408 or DAE App 2 412, that is currently running in the browser section 404 of the ITF 2. If the notification is a third party notification 416, then the notification is forwarded to the third party notification handler 420, which acts similarly to a router function, in the ITF 2.

The third party notification handler 420 then determines if the received notification needs to go to a DAE browser based application 402, or an ITF embedded application 406. If the notification is to go to a DAE browser based application 402 a uniform resource locator (URL) is sent that the browser 404 can access for the DAE browser based application 402. If the received notification is to go to an ITF embedded application 406, the notification is sent through an application programming interface (API) to the desired ITF embedded application 406 for use. Additionally, while not shown in FIG. 4, messages, such as initial service requests, can originate from the ITF 2 and be sent to the IMS gateway 4 for transmission to the IMS network 10.

As described above, ITF 2 can transmit requests from active applications to IMS gateway 4 using HTTP signaling. According to exemplary embodiments, to facilitate correct tracking of applications, particularly for coordination of SIP messages received at the IMS gateway 4, a unique application identification (ID), per application, is inserted into the HTTP request message from the ITF 2 to the IMS gateway 4. These requests can be generated for both DAE applications 408, 412 and ITF embedded applications 406 running on ITF 2. For DAE applications 408, 412, and ITF embedded applications 406, European Computer Manufacturers Association (ECMA) script can be used for inserting the unique application ID into a header or header extension of an HTTP request message. These application IDs may or may not be standardized, but should be unique to facilitate appropriate routing of messages. One method for ensuring uniqueness includes having the application ID represented by a service uniform resource name (URN) with certain properties which describe uniqueness. For more information regarding URNs the interested reader is directed to RFC 2141, dated May 1997. Additionally, a new field could be added to the HTTP request message for carrying this unique application ID, as indicated above.

According to exemplary embodiments, once the HTTP request from the ITF 2 is received by the IMS gateway 4, the unique application ID is maintained in the IMS gateway 4 along with the corresponding SIP dialog, and the stored state where applicable. Additionally, upon the receipt of the HTTP request and the creation of the SIP dialog, the IMS gateway 4 maintains the dynamic information related to the type of notification to be used, e.g., third party notification or in session notification, for the SIP dialog for ongoing event reporting.

As described above, the IMS gateway 4 stores information regarding applications running on ITF 2 and SIP dialog information. According to exemplary embodiments, identifying information is stored in register 308 such that the information from incoming SIP messages 214 can be forwarded to the correct application running on ITF 2. Exemplary tables 500 and 520 are shown in FIGS. 5(*a*) and 5(*b*), respectively, for storing identifying information in register 308. The exemplary application identification table 500 in register 308 can, for example, be used by the IMS gateway 4 for handling third party notifications. More specifically, in this example, application identification table 500 is pre-configured, typically by the service provider (SP) remotely, with application IDs for the DAE applications provided by the service provider and the URL to be used for their respective DAE application. The ITF embedded applications, which do not need to use a URL, register with the IMS gateway 4 during start up over the home network interface—IMS gateway interface (HNI-IGI) (not shown). The ITF 2 deployment includes a display capability and user interaction capabilities.

For each application an IMS communication service identifier (ICSI) can be defined which is used by the IMS gateway 4 according to this exemplary embodiment to assist in matching incoming SIP messages 214 to applications and to check outgoing SIP messages for compliance with IMS requirements. In some cases, multiple instances of the same application may be operating on ITF 2 simultaneously. In support of this, exemplary traffic table 520 stores information allowing IMS gateway 4 to distinguish different instances of an application. Using, at various times, these different pieces of identifying information stored on tables 500 and 520, the IMS gateway 4 can identify which notifications or messages should be routed toward which applications (or application instances) in ITF 2. Exemplary application identification table 500 and traffic table 520 are described in more detail below. Also, while application identification table 500 and traffic table 520 are shown as two separate tables, they could be stored in a single table or alternatively the information could be further distributed, while still being bound, over more than two tables.

As shown in FIG. 5(a), application identification table 500 maintains a binding, as shown by reading across a row 502, between application ID 504, URLs 508 used in third party notification for a DAE application and ICSIs 506 as needed. Additionally, a default DAE application which uses a default URL is shown which can be used when incoming SIP messages do not include an ICSI or an application ID (as shown by the entry "undefined" in application identification table 500). The application identification table 500 provides information for the notification router 308 to used when handling events where the incoming SIP message includes the ICSI, the application ID, both the ICSI and the application ID and neither the ICSI nor the application ID. This information along with other information is used by the IMS gateway 4 to handle events.

According to exemplary embodiments, as shown in FIG. 5(b), traffic table 520 maintains a binding between a SIP dialog, or application identifying information in specific SIP headers of incoming SIP messages 214 and an application instance. Each binding is represented in table 520 as shown by each Entry 522, 524, 526 where Entry1 522 could represent a SIP dialog (or application identifying information) bound to a first instance of an application, Entry2 524 could represent a second instance of the same application, or a first instance of a different application and Entry3 526 could represent a third instance of the same application, or a first instance of a different application currently operating on ITF 2. Once an Entry 522, 524, 526 is selected for handling any incoming SIP message 214, the Entry 522, 524, 526 should contain enough state information to allow the IMS gateway 4 to uniquely identify the TCP to be used for incoming traffic destined for the associated application instance. Additionally, using a value associated with the TCP transmission, including a hash of a TCP value, in this manner also allows the IMS gateway 4 to know when the application instance has ended, e.g., the TCP connection ends in an appropriate manner, and to enable error recovery if multiple TCP links for different instances of the same application end inappropriately, e.g., multiple TCP links shut down roughly at the same time. Also, according to exemplary embodiments, additional state information can be stored in each Entry 522, 524, 526 as desired by the traffic table 520.

According to exemplary embodiments, different traffic scenarios can generate the need for an Entry 522, 524, 526 to be created and stored in traffic table 520. In a first scenario, traffic, e.g., messages and/or signaling, originates from an application on the ITF 2 and is sent to IMS gateway 4 which requires a SIP dialog to be maintained. The IMS gateway 4 forwards a request to the IMS network 10 to establish a session and a SIP dialog is created and maintained. An Entry 522, 524, 526 is then created and stored in traffic table 520 that binds the application instance with the SIP dialog and stores any other desired state information, e.g., TCP information.

According to exemplary embodiments, in a second traffic scenario, traffic originates from an application on the ITF 2, is sent to IMS gateway 4 and does not require a SIP dialog to be created and maintained. In this scenario, an Entry 522, 524, 526 does not need to be made in traffic table 520. Instead, depending upon the originating application on ITF 2, either a SIP state is created and stored in memory in IMS gateway 4 if, for example, the originating application is a registration application (or the like), or no state is maintained after the successful completion of the interaction with the IMS network 10 if, for example, the originating application is an instant messaging application, a stand-alone transaction application (or the like).

According to another exemplary embodiment, in a third traffic scenario, a SIP message 214 is received by the IMS gateway 4 from the IMS network 10 for which there is no entry in the traffic table. In this scenario, the IMS gateway 4 uses the application identification table 500 to identify an appropriate application and forwards the request to the appropriate application on ITF 2 as is explained in more detail below. Depending upon the application identified an Entry 522, 524, 526 can be made in traffic table 520. For example, if the identified application requires that a SIP dialog be maintained, then an Entry 522, 524, 526 is created following the receipt of a successful response by the IMS gateway 4 from the ITF 2. In another example, if the identified application does not require that a SIP dialog be maintained, than an Entry 522, 524, 526 is not created and stored in traffic table 520. Instead, the transaction is completed and the IMS gateway 4 remains stateful until such time as the entire transaction is successfully completed. In yet another example, if the identified application does not require a SIP dialog but would like to remain active for incoming messages, it can indicate so by maintaining its TCP connection and then an Entry 522, 524, 526 is created and maintained in traffic table 520.

Thus, according to exemplary embodiments, an IMS gateway 4 handles different incoming SIP messages from the IMS network 10 which require a notification to be sent to the ITF 2 in different ways depending upon information available to the IMS gateway 4. In a first exemplary embodiment, the IMS gateway 4 determines if there is a previously existing SIP dialog associated with an incoming SIP message by consulting traffic table 520. If there is a previously existing SIP dialog associated with the incoming SIP message then an in session notification is sent by the IMS gateway 4 over the TCP link to the appropriate application instance. The notification sent includes the payload portion (or an encapsulated version) of the received SIP message, including pertinent SIP headers.

The second way to interface applications with SIP communications is associated with applications which do not require a SIP dialog, but have a state maintained in the IMS gateway 4, e.g., registration. In another exemplary embodiment, the IMS gateway 4 receives a SIP message from IMS network 10 for which there is no preexisting SIP dialog. However, in this case, there is state information stored in traffic table 520 that allows IMS gateway 4 to identify the intended application instance, and send the notification to the correct application instance in ITF 2 over the appropriate TCP link using in session notification for that purpose. The notification sent includes the payload portion (or an encapsulated version) of the received SIP message, including pertinent SIP headers.

This third way to interface applications with SIP communications, from the perspective of the IMS gateway 4, is associated with applications that do not require a SIP dialog and do not require a state, e.g., messaging and caller identification. In another exemplary embodiment, the IMS gateway 4 receives a SIP message from IMS network 10 for which there is no corresponding SIP dialog and no currently maintained state information exists in traffic table 520, e.g., the case for new incoming SIP messages from the IMS network 10. In this case, identifying an application ID requires consulting table 500 and also depends on the contents of the incoming message, typically the contents in the Accept-Contact SIP header. According to exemplary embodiments, the Accept-Contact field in the SIP header can include information which would allow the IMS gateway 4 to match up the SIP message with an application running on ITF 2. For example, the Accept-Contact field in a SIP header could include a URL, an application ID or an ICSI. For more information regarding the Accept-Contact field in SIP messages, the interested reader is directed to RFC 3841 dated 2004. Using this information, the IMS gateway 4 then links the SIP message to an application on the ITF 2 and forwards the notification using third party notification for that purpose. The notification sent includes, in addition to information selected from the matched entry in table 500, the payload portion (or an encapsulated version) of the received SIP message, including pertinent SIP headers.

According to yet another exemplary embodiment, the IMS gateway 4 receives a SIP message from IMS network 10 which explicitly includes only an ICSI, then the IMS gateway 4 assumes and uses a default application ID. The application identification table 500 is typically populated with a default application ID for use with any ICSI as needed. For example, as shown in rows 514 and 516 in FIG. 5(a), ICSI1 and ICSI 2 are bound to a default application ID. Using this default application ID, the IMS gateway 4 forwards the received notification to the default application ID on ITF 2. Additionally, in the case where the incoming SIP message from the IMS network 10 does not include either an ICSI or an application ID, then a default URL is used.

According to another exemplary embodiment, the IMS gateway 4 receives a SIP message from IMS network 10 which explicitly includes both an ICSI and an application ID, then the router function 302 is able to link the received notification to an application operating on ITF 2 by consulting application identification table 500. In this case, the IMS gateway 4 then sends a message, e.g., third party notification, to the ITF 2 which includes the notification information for forwarding to the identified application. The notification sent includes, in addition to information selected from the matched entry in table 500, the payload portion (or an encapsulated version) of the received SIP message including pertinent SIP headers.

After the IMS gateway 4 receives a SIP message and determines whether it is an in-session notification or a third party notification, the IMS gateway 4 transmits the notification appropriately. For example, if the SIP message is an in session notification, as typically determined by state information, the IMS gateway 4 sends the notification information, using HTTP signaling or other signaling schemes, to the appropriate application running in the ITF 2. If the notification is determined to be a third party notification the notification information is transmitted to the third party notification handler 420 in ITF 2 which sends it to the correct application, e.g., an ITF embedded application 406 or a DAE browser application 402. The third party notification handler 420 makes this determination based on information received in the third party notification message 416. Initially, the third party notification handler 420 looks for an application ID in the third party notification message 416. If an application ID is present, and is not recognized by the third party notification handler 420, then the included URL is used to fetch a network application DAE to handle the request. In the case where the third party notification handler 420 recognizes the application ID, then it considers the desired application to be an ITF embedded application 406 and forwards the notification accordingly using an appropriate API.

According to other exemplary embodiments, requests can be generated from ITF 2 which result in outgoing traffic being transmitted from the IMS gateway 4 to the IMS network 10. Various methods can be used to uniquely identify the originating application such that subsequently received incoming SIP messages can be matched with the desired application. For example, if a DAE application 408, 412, or an ITF embedded application 406 originates a message, it can embed the application ID in a new HTTP header which will then be extracted by the IMS gateway 4. Alternatively, the DAE application 408, 412, and the ITF embedded application 406, can include an ICSI in a new HTTP extension header which can then be used, together with additional information in SIP headers, by the IMS gateway 4 in conjunction with application identification table 500 to locate the application ID.

Exemplary signaling diagrams will now be described with respect to FIGS. 6-9 which are based upon the above described exemplary systems and methods. FIG. 6(a) shows an exemplary signaling diagram for receiving a SIP message to start a messaging application for which there is no messaging application currently active on ITF 2. Initially a SIP MESSAGE 602, which includes the information "appid=MESSAGING" in the accept-contact header, is transmitted from the P2P Communication Enabler 12 to the CSCF 6 which forwards the SIP MESSAGE 602 to the authentication/session management function 306 within IMS gateway 4. The IMS gateway 4 consults traffic table 520 and sees no entry matching the incoming SIP message. The IMS gateway then consults application identification table 500 and locates the application ID based on the received Accept-Contact header information, e.g., "appid=MESSAGING", and the information in table 500 as needed. Authentication/session management function 306 then transmits a message 604 to invoke third party notification to the IG-ITF server 304. The IG-ITF server 304 then sends a message 606 to invoke third party notification including an application ID ("appid") and a URL (obtained from the application identification table 500) to the ITF 2.

In this example, the third party notification handler 420 in ITF 2 does not recognize the received appid, and instead, the ITF 2 uses the received URL to fetch the application as shown in message 614. When the network server 8 received the HTTP Get URL message 614, a 200 OK message which includes a generic DAE application handler with ECMA script is sent back to the ITF 2 as shown in message 616. At about the same time, the IG-ITF server 304 sends an operation result 608 back to the authentication/session management function 306. Based upon the operation result 608, the authentication/session management function 306 transmits a 202 ACCEPTED message 610 to the CSCF 6 which then transmits a 202 ACCEPTED message 612 to the P2P communication enabler 12. If the messaging application desires to remain active, it maintains the TCP connection. The IMS gateway 4 then creates an entry in traffic table 520 and maintains additional SIP and application related state information. This allows the messaging application to be later invoked, using in session notification as opposed to using third party notification in this case, if an incoming SIP message is destined for that application.

Figure 6B:
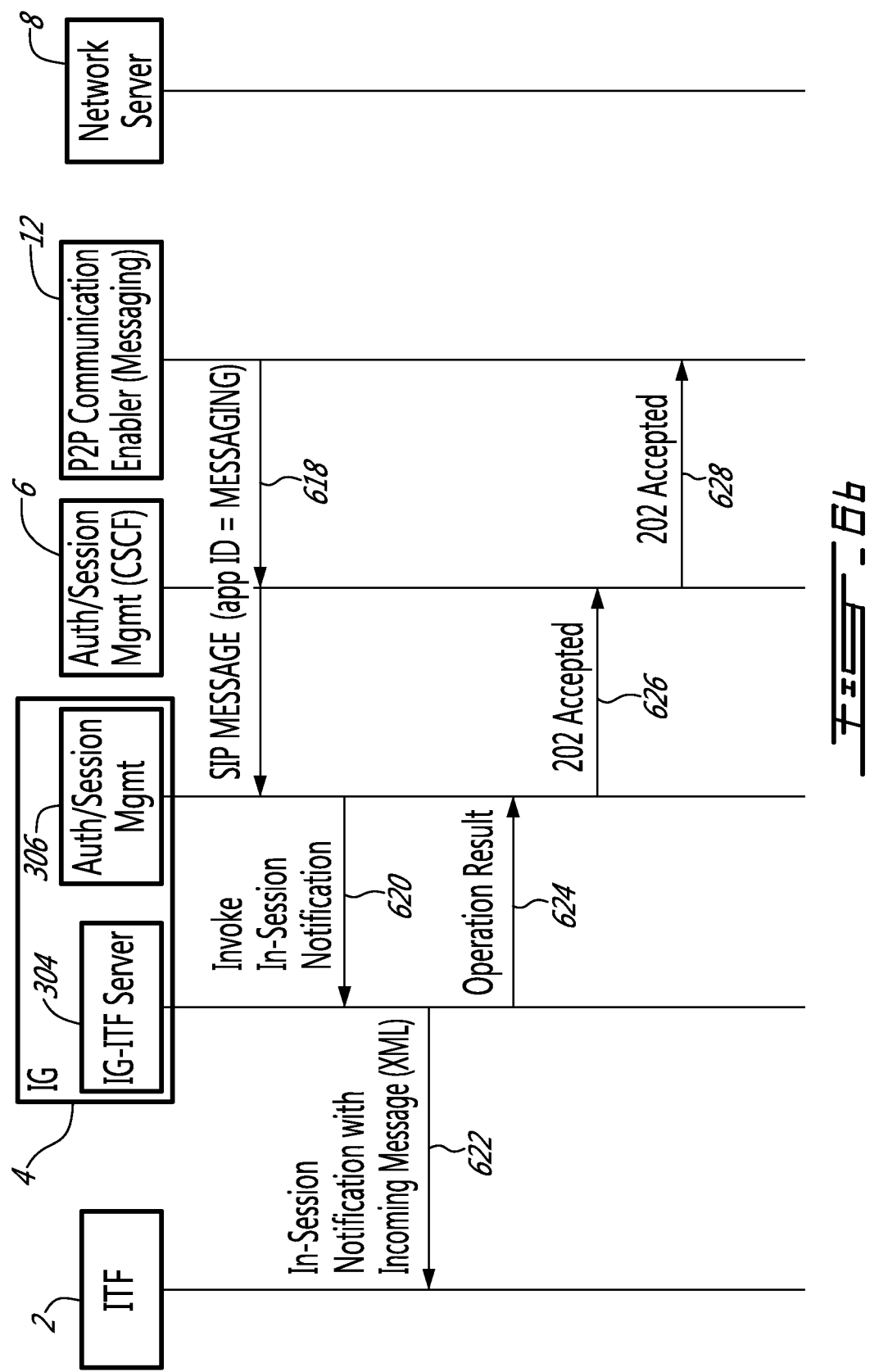

According to exemplary embodiments, FIG. 6(b) shows an exemplary signaling diagram for receiving a SIP message regarding a messaging application when a messaging DAE is currently active and running in the ITF 2 and has a permanent TCP connection with the IG-ITF server 304. Initially a SIP MESSAGE 618 which includes the information "appid=MESSAGING" in the Accept-Contact header is transmitted from the P2P Communication Enabler 12 to the CSCF 6 which forwards the SIP MESSAGE 618 to the authentication/session management function 306 within IMS gateway 4. The IMS gateway 4 consults traffic table 520 and locates an entry in the traffic table 520 that can handle the incoming SIP message based on the Accept-Contact header in the SIP MESSAGE 618. Additionally, based on its stateful ability, the IMS gateway 4 realizes that a DAE message application is currently running on ITF 2 and as such in-session notification should be used. Authentication/session management function 306 then transmits a message 620 to invoke in-session notification to the IG-ITF server 304. The IG-ITF server 304 then sends a message 622 for invoking in-session notification to ITF 2 which can use extensible markup language (XML). An operation result message 624 is then sent from the IG-ITF server 304 to the authentication/session management function 306. The authentication/session management function 306 then transmits a 202 Accepted message 626 to the CSCF 6 which then transmits a 202 Accepted message 628 to the P2P communication enabler 12.

According to exemplary embodiments, FIG. 7 shows exemplary signaling when the ITF 2 is running a presence application. Initially, a user starts a presence application which has been previously fetched and which establishes a TCP connection with the IG-ITF server 304 for presence notifications. This results in an entry created in traffic table 520, which the IMS gateway 4 can use to match incoming SIP presence notification messages related to the same dialog, which further allows the IMS gateway 4 to use in-session notification for transferring incoming presence notification messages to the presence application in ITF 2. Upon receiving a SIP NOTIFY message 702 which includes presence information from the P2P communication enabler 12 via the CSCF 6, the IMS gateway 4 matches the message 702 with the appropriate SIP dialog in traffic table 520, and selects the appropriate application instance. Additionally, the IMS gateway 4 understands that it should use in-session notification in this case. Authentication/session management function 306 then transmits a message 704 to invoke in-session notification to the IG-ITF server 304. The IG-ITF server 304 then sends a message 706 to ITF 2 for invoking in-session notification including the incoming NOTIFY which can be in XML. An operation result message 708 is then sent from the IG-ITF server 304 to the authentication/session management function 306. The authentication/session management function 306 then transmits a 200 OK message 710 to the CSCF 6 which then transmits a 200 OK message 712 to the P2P communication enabler 12.

According to exemplary embodiments, FIG. 8(a) shows exemplary signaling for a case of messaging using an ITF embedded application. Initially, P2P communication enabler 12 transmits a SIP MESSAGE 802 which includes "ICSI=MESSAGING" in the accept-contact header to CSCF 6 which forwards SIP MESSAGE 802 to the authentication/session management function 306 in the IMS gateway 4. The IMS gateway 4 takes information in the Accept-Contact, consults traffic table 520 and sees no entry matching the incoming SIP message. The IMS gateway then consults application identification table 500 and matches the received ICSI to an ICSI stored in table 500 which is bound to an application ID, e.g., found in the same row 511 of table 500. The authentication/session management function 306 transmits a message 804 to the IG-ITF server 304 with information for the ITF 2 to invoke third party notification. The IG-ITF server 304 then transmits a message 806 to invoke third party notification which includes an application ID to the ITF 2. The third party notification handler 420 in ITF 2 receives message 806 and recognizes the application ID and ITF 2 then launches the embedded messaging application, e.g., an ITF embedded application 406 for messaging is launched instead of a DAE browser based application 402 for messaging. An operation result message 808 is then sent from the IG-ITF server 304 to the authentication/session management function 306. The authentication/session management function 306 then transmits a 202 Accepted message 810 to the CSCF 6 which then transmits a 202 Accepted message 812 to the P2P communication enabler 12. The ITF embedded application 406 may choose to remain active and maintain the TCP connection, in which case the IMS gateway 4 creates an entry in traffic table 520 allowing subsequent incoming messages destined for that application to be delivered using in-session notification.

According to exemplary embodiments, FIG. 8(b) shows exemplary signaling for receiving a SIP message regarding a messaging application when an active embedded message application is currently running in the ITF 2 which has a TCP connection with the IG-ITF server 304. Initially a SIP MESSAGE 814 which includes the information "ICSI=MESSAGING" in the Accept-Contact header is transmitted from the P2P Communication Enabler 12 to the CSCF 6 which forwards the SIP MESSAGE 814 to the authentication/session management function 306 within IMS gateway 4. The IMS gateway 4 then consults traffic table 520 and locates an entry that can handle the incoming messages based on the information in the Accept-Contact header in the SIP MESSAGE 814. Based on its stateful ability, the IMS gateway 4 realizes that in-session notification should be used. Authentication/session management function 306 then transmits a message 816 to invoke in-session notification to the IG-ITF server 304. The IG-ITF server 304 then sends a message 818 to the ITF 2 to invoke in-session notification including information which can be in XML. An operation result message 820 is then sent from the IG-ITF server 304 to the authentication/session management function 306. The authentication/session management function 306 then transmits a 202 Accepted message 822 to the CSCF 6 which then transmits a 202 Accepted message 824 to the P2P communication enabler 12.

According to exemplary embodiments, FIG. 9 shows exemplary signaling for receiving a SIP message which does not include an application ID or an ICSI at IMS gateway 4. Initially, P2P communication enabler 12 transmits a SIP PUBLISH message 902 to CSCF 6 which forwards the SIP PUBLISH message 902 to the authentication/session management function 306 in IMS gateway 4. The IMS gateway 4 notices that the received SIP PUBLISH message 902 lacks both an application ID and an ICSI in the Accept-Contact header, hence it does not consult traffic table 520, and rather consults application identification table 500, and picks the application from table 500 which has the default URL. The authentication/session management function 306 transmits a message 904 to invoke third party notification to the IG-ITF server 304. The IG-ITF server 304 then sends a message 906 to invoke third party notification which includes the default URL obtained from table 500. The ITF 2 receives message 906 and the third party notification handler 420 does not see an application ID and instead uses the supplied URL to fetch a DAE application to handle this request as shown in the HTTP Get URL message 908 which is sent to network server 8. Network server 8 responds to ITF 2 with a 200 OK message 910 which includes a DAE default application handler (which typically includes some extensible hyper text markup language (XHTML) and Ecma script instructions). An operation result message 912 is then sent from the IG-ITF server 304 to the authentication/session management function 306. The authentication/session management function 306 then transmits a 200 OK message 914 to the CSCF 6 which then transmits a 200 OK message 916 to the P2P communication enabler 12.

According to exemplary embodiments using the above described systems and methods, the IMS gateway 4 can have the ability to perform error recovery for various errors, such as, the loss of multiple TCP links with ITF 2. In this case, where multiple application instances are currently active in ITF 2, each application instance will have a different TCP link up for communication with IMS gateway 4. These TCP links will be up as long as the application instance is up and running. When a TCP link goes down, the IMS gateway 4 detects the loss of the TCP link and waits, e.g., for approximately 40-60 seconds, based on a configurable timer for the application instance to re-establish a new link to allow the IMS gateway 4 to update the proper Entry 522, 524 and 526 in the traffic table 520.

According to exemplary embodiments, if the timer associated with re-establishment of the TCP link expires, the IMS gateway 4 assumes that the application instance has ended and proceeds to terminate the corresponding network side communications and remove that Entry 522, 524 or 526 from the traffic table 520. If the application instance has not ended, it will typically send to its peer, as part of the TCP link re-establishment, what is equivalent to a SIP UPDATE, which does not change any SIP state information but rather allows the IMS gateway 4 to handle error recovery in the case of multiple link failures. In this case of multiple link failures for multiple instances of the same application, the IMS gateway 4 can use information in a SIP UPDATE message in conjunction with state information stored in traffic table 520 to uniquely identify the intended application instance and enable successful error recovery.

The exemplary embodiments described above provide for messages and protocols involving person to person communications. An exemplary communications node 1000 which can perform the functions of an IMS gateway 4 will now be described with respect to FIG. 10. Communications node 1000 can contain a processor 1002 (or multiple processor cores), a memory 1004, one or more secondary storage devices 1006 and an interface unit 1008 to facilitate communications between communications node 1000 and other networks and devices. Memory 1004 and/or secondary storage devices 1006 can be used to store both state information as well as tables 500 and 520. Logic and protocols can be also contained within communications node 1000 to be used with processor 1002 for determining notification type as well as all other exemplary functions described above performed by IMS gateway 4.

Utilizing the above described exemplary systems according to exemplary embodiments, a method for facilitating communications between devices which utilize different protocols is shown in the flow chart of FIG. 11. Initially, a method for correlating application information between an Internet Multimedia Subsystem (IMS) network and a non-IMS node includes: receiving, at a gateway, a first message using a first signaling protocol at a gateway from an IMS network in step 1102; reading information from the first message in step 1104; correlating the information with previously stored information to determine which one of a plurality of applications running on the non-IMS node is associated with the first message in step 1106; and transmitting a second message towards the non-IMS node using a second signaling protocol which is different from the first signaling protocol, wherein the second message includes information associated with the one of a plurality of applications running on the non-IMS node which is associated with the first message in step 1108.

As will be appreciated by those skilled in the art, methods such as that illustrated in FIG. 11 can be implemented completely or partially in software. Thus, systems and methods for processing data according to exemplary embodiments of the present invention can be performed by one or more processors executing sequences of instructions contained in a memory device. Such instructions may be read into the memory device 1004 from other computer-readable mediums such as secondary data storage device(s) 1006, which may be fixed, removable or remote (network storage) media. Execution of the sequences of instructions contained in the memory device causes the processor to operate, for example, as described above. In alternative embodiments, hard-wired circuitry may be used in place of or in combination with software instructions to implement exemplary embodiments.

The above-described exemplary embodiments are intended to be illustrative in all respects, rather than restrictive, of the present invention. All such variations and modifications are considered to be within the scope and spirit of the present invention as defined by the following claims. For example, multiple ITFs 2 may be in communication with IMS gateway 4 in a single household and in this case the IMS gateway 4 is still able to uniquely identify applications on any ITF 2 that is in communications with it by, for example, storing additional information in tables 500 and 520 which reference the ITF an application is running on. Additionally, the exemplary services described above are purely illustrative and other IMS services can be supported through the above described systems and methods. No element, act, or instruction used in the description of the present application should be construed as critical or essential to the invention unless explicitly described as such. Also, as used herein, the article "a" is intended to include one or more items.

What is claimed is:

1. A method for correlating application information between an Internet Protocol (IP) Multimedia Subsystem (IMS) network and a non-IMS node, the method comprising:
   receiving, at a gateway, a first message using a first signaling protocol from said IMS network, the first message being part of an IMS protocol based session;
   associating the received first message with an instance of an application selected from a plurality of applications running on said non-IMS node in accordance with an application instance identification table, the application instance identification table correlating the received first message with the instance of the application running on the non-IMS node; and
   transmitting a second message towards said non-IMS node using a second signaling protocol that is different from said first signaling protocol, said second message including an application instance identification corresponding to the instance of the associated application, the application instance identification being used to route the second message to the instance of the associated application running on said non-IMS node.

2. The method of claim 1, wherein said gateway uses a SIP dialog for the associated instance of the application running on said non-IMS node.

3. The method of claim 2, further comprising:
   receiving a subsequent message which is for said associated instance of the application running on said non-IMS node; and transmitting an in-session notification message towards said non-IMS node.

4. The method of claim 1, wherein said gateway has a state maintained in a memory for said instance of the associated application running on said non-IMS node.

5. The method of claim 1, wherein said gateway is stateless for said associated instance of the application running on said non-IMS node.

6. The method of claim 1, wherein said first message is a Session Initiation Protocol (SIP) message which includes information in a contact-accept header.

7. The method of claim 6, wherein said information is at least one of a Uniform Resource Locator (URL) and an IMS Communication Service Identifier (ICSI).

8. The method of claim 1, wherein said second signaling protocol is Hyper Text Transfer Protocol (HTTP).

9. The method of claim 1 further comprising:
receiving a third message using said second signaling protocol from said non-IMS node which includes an application identification (ID), wherein said second message is an HTTP request message.

10. The method of claim 1, wherein said application identification table contains previously stored information including URLs, ICSIs and application IDs which have been stored.

11. The method of claim 1, wherein each instance of said associated application is uniquely identified by the application instance identification.

12. The method of claim 11, wherein said unique application instance identification is created from a concatenation of an application identification with a hashing of a transmission control protocol (TCP) value.

13. The method of claim 11, wherein entries are created for said table by at least one of receiving a message originating from a first instance of the application which requires a SIP dialog to be maintained and receiving a SIP message which is associated with a second instance of the application which requires a SIP dialog to be maintained.

14. The method of claim 1, further comprising:
establishing a SIP dialog after receiving said first message;
storing additional information which links said SIP dialog and said instance of the application; and
using in-session notification for subsequently received messages from said IMS network which are associated with said instance of the application based upon said stored additional information.

15. The method of claim 1 further comprising:
establishing a transmission control protocol (TCP) connection with said non-IMS node after initiation of said instance of the application; and
terminating said TCP connection with said non-IMS node after said instance of the application is deactivated.

16. The method of claim 1, wherein said non-IMS node is an Internet Protocol television terminal function (ITF).

17. The method of claim 1, wherein said application is at least one of a distributed application environment (DAE) application and an embedded ITF application.

18. A gateway device comprising:
a communication interface configured to transmit and receive messages, a first received message being from an IMS network, having a first signaling protocol and including information associated with an application;
a memory configured to store information that includes application instance identifications (IDs), Uniform Resource Locators (URLs), default information and IMS Communication Service Identifiers (ICSIs); and
a processor for correlating said first received message having said first signaling protocol with the information stored in the memory to associate the message with an instance of an application selected from a plurality of applications to which to route a second message using a second signaling protocol different from said first signaling protocol, said second message using said using said second signaling protocol including an application instance identification corresponding to said instance of the associated application, wherein the application instance identification is used to route the second message to the instance of the associated application on a non-IMS node.

19. The gateway device of claim 18, wherein said gateway uses a SIP dialog for said instance of the associated application running on said non-IMS node.

20. The gateway device of claim 19, further comprising:
at said communications interface, receiving a subsequent message which is for associated instance of the application running on said non-IMS node and transmitting an in-session notification message towards said non-IMS node.

21. The gateway device of claim 18, wherein said gateway has a state maintained in a memory for said associated instance of the application running on said non-IMS node.

22. The gateway device of claim 18, wherein said gateway is stateless for said associated instance of the application running on said non-IMS node.

23. The gateway device of claim 18, wherein said first message is a Session Initiation Protocol (SIP) message which includes said information in a contact-accept header.

24. The gateway device of claim 18, wherein said information is at least one of a Uniform Resource Locator (URL) and an ICSI.

25. The gateway device of claim 18, wherein said second signaling protocol is Hyper Text Transfer Protocol (HTTP).

26. The gateway device of claim 18 further comprising:
at said communications interface, receiving a third message using said second signaling protocol from said non-IMS node which includes an application identification (ID), wherein said second message is an HTTP request message.

27. The gateway device of claim 18 further comprising:
a pre-configured table, configured to store said previously stored information, which includes URLs, ICSIs and application IDs.

28. The gateway device of claim 18, wherein the memory maintains an instance table including each instance of said application, each instance being uniquely identified in said memory and by the application instance identification.

29. The gateway device of claim 28, wherein said unique application instance identification is created from a concatenation of an application identification with a hashing of a transmission control protocol (TCP) value.

30. The gateway device of claim 28, wherein entries are created for said memory by at least one of receiving a message originating from a first instance of the application which requires a SIP dialog to be maintained and receiving a SIP message which is associated with a second instance of the application which requires a SIP dialog to be maintained.

31. The gateway device of claim 18, wherein:
said gateway is configured to establish a SIP dialog after receiving said first message; and
said memory is configured to store additional information that links said SIP dialog and said instance of the application, wherein said gateway uses in-session notification for subsequently received messages from said IMS network that are associated with said instance of the application based upon said stored additional information.

32. The gateway device of claim 18, wherein said gateway establishes a transmission control protocol (TCP) connection with said non-IMS node after initiation of said instance of the application, and terminates said TCP connection with said non-IMS node after said instance of the application is deactivated.

33. The gateway device of claim 18, wherein said non-IMS node is an Internet Protocol television terminal function (ITF).

34. The gateway device of claim 18, wherein said application is at least one of a distributed application environment (DAE) application and an embedded ITF application.

\* \* \* \* \*